US007271205B2

(12) United States Patent
Mathew et al.

(10) Patent No.: US 7,271,205 B2
(45) Date of Patent: Sep. 18, 2007

(54) NON-CRYOGENIC PROCESS FOR GRANULATING POLYMER DRAG REDUCING AGENTS

(75) Inventors: Thomas Mathew, Tulsa, OK (US); Keith D. Fairchild, Sand Springs, OK (US); Nagesh S. Kommareddi, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 44 days.

(21) Appl. No.: 11/231,176

(22) Filed: Sep. 20, 2005

(65) Prior Publication Data

US 2007/0066712 A1 Mar. 22, 2007

(51) Int. Cl.
*C08J 3/11* (2006.01)
*C08J 3/12* (2006.01)

(52) U.S. Cl. .................................... 523/175; 241/15

(58) Field of Classification Search ................ 523/175; 528/502 R, 502 F; 241/15
See application file for complete search history.

(56) References Cited

U.S. PATENT DOCUMENTS

| | | | | |
|---|---|---|---|---|
| 2,879,173 | A | 3/1959 | Yocoe | 117/6 |
| 3,351,601 | A | 11/1967 | Blaga et al. | 260/28.5 |
| 3,528,841 | A | 9/1970 | Donaldson et al. | 117/16 |
| 3,884,252 | A | 5/1975 | Kruka | 137/13 |
| 4,016,894 | A | 4/1977 | Baldwin et al. | 137/13 |
| 4,177,177 | A | 12/1979 | Vanderhoff et al. | 260/29.2 M |
| 4,212,312 | A | 7/1980 | Titus | |
| 4,263,926 | A | 4/1981 | Drake et al. | 137/13 |
| 4,340,076 | A | 7/1982 | Weitzen | 137/13 |
| 4,499,214 | A | 2/1985 | Sortwell | |
| 5,244,937 | A | 9/1993 | Lee et al. | |
| 5,449,732 | A | 9/1995 | Smith et al. | |
| 5,504,131 | A | 4/1996 | Smith et al. | |
| 5,504,132 | A | 4/1996 | Smith et al. | |
| 5,539,044 | A | 7/1996 | Dindi et al. | |
| 5,733,953 | A | 3/1998 | Fairchild et al. | |
| 5,869,570 | A | 2/1999 | Eaton et al. | |
| 6,172,151 | B1 | 1/2001 | Johnston et al. | |
| 6,399,676 | B1 | 6/2002 | Labude et al. | |
| 6,649,670 | B1 | 11/2003 | Harris et al. | |
| 6,765,053 | B2 | 7/2004 | Labude et al. | |
| 6,894,088 | B2 | 5/2005 | Motier et al. | |
| 6,939,902 | B2 | 9/2005 | Smith et al. | |
| 6,946,500 | B2 | 9/2005 | Harris et al. | |
| 7,119,132 | B2 | 10/2006 | Harris et al. | |
| 2002/0198116 | A1 | 12/2002 | Eaton et al. | |
| 2003/0065054 | A1 | 4/2003 | Smith et al. | |
| 2003/0065055 | A1 | 4/2003 | Johnston et al. | |
| 2004/0198619 | A1 | 10/2004 | Eaton et al. | |

FOREIGN PATENT DOCUMENTS

| | | | |
|---|---|---|---|
| CA | 675522 | 12/1963 | 241/135 |

*Primary Examiner*—Peter Szekely
(74) *Attorney, Agent, or Firm*—Madan, Mossman & Sriram P.C.

(57) ABSTRACT

A method for producing a particulate polymer drag reducing agent, comprising granulating a bulk polymer DRA having an average size of greater than about 100 mm in the presence of a liquid wetting agent to form a granulated polymer DRA having an average size of from about 1 to about 100 mm. The granulated polymer DRA may then be ground to form a particulate polymer DRA having an average particle size of less than about 1 mm. The “wet” granulation process may advantageously enable one-step granulation and therefore simplified production of polymer DRAs. Examples of the liquid wetting agent include blends of glycols with water and/or an alcohol. Preferred production apparatus includes use of multiple rotary jaws for the granulation.

16 Claims, No Drawings

NON-CRYOGENIC PROCESS FOR GRANULATING POLYMER DRAG REDUCING AGENTS

FIELD OF THE INVENTION

The invention relates to processes for producing polymeric drag reducing agents in a finely divided particulate form, and more particularly to processes for granulating polymeric drag reducing agents to produce comminuted material, suitable for subsequent grinding.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents, or DRAs, have taken various forms in the past, including slurries or dispersions of ground polymers to form free-flowing and pumpable mixtures in liquid media. A problem frequently experienced with simply grinding the polyalpha-olefins (PAOs), however, is that the particles will "cold flow" or stick together after the passage of time, thus making it impossible to place the PAO in the hydrocarbon where drag is to be reduced in a form of suitable surface area, i.e., particle size, that will dissolve or otherwise mix with the hydrocarbon in an efficient and effective manner. Further, the grinding process or mechanical work employed in size reduction often degrades the polymer, thereby reducing its drag reduction efficiency.

One common approach to preventing or reducing cold flow problems is to coat the ground polymer particles with an anti-agglomerating or partitioning agent. Cryogenic grinding of the polymers to produce the particles prior to or simultaneously with coating with an anti-agglomerating agent has also been used. However, some powdered or particulate DRA slurries require special equipment for preparation, stable storage and injection into a conduit to ensure that the DRA is completely and effectively dissolved in the hydrocarbon stream.

Gel or solution DRAs (those polymers essentially being in a viscous solution with hydrocarbon solvent) have also been tried in the past. However, these drag reducing gels also demand specialized injection equipment, as well as pressurized delivery systems. The gel or solution DRAs are relatively stable and have a defined set of conditions that must be met by mechanical equipment to pump them, including, but not necessarily limited to, their viscosity, vapor pressure, shear properties, and the like. The gel or solution DRAs are also limited to about 10 percent by weight polymer as a maximum concentration in a carrier fluid due to their typical high solution viscosity. Thus, transportation costs for these DRAs are often considerable and prohibitive, since up to about 90 percent of the volume being transported and handled is inert material.

U.S. Pat. No. 2,879,173 describes a process for preparing free-flowing pellets of polychloroprene that involves suspending drops of an aqueous dispersion of the polychloroprene in a volatile, water-immiscible organic liquid in which the polymer is insoluble at temperatures below −20° C. Once the drops are completely frozen and the polychloroprene coagulated, the frozen pellets are separated from the suspending liquid and coated, while still frozen, with from 5 percent to 20 percent of their dry weight of a powder which does not react with the polychloroprene under normal atmospheric conditions. Finally, the water and any adhering organic liquid are removed via vaporization effected by warming the pellets.

U.S. Pat. No. 3,351,601 describes a method for coating pellets of a normally sticky thermoplastic binder material by using a mixture of a minor proportion of a vinyl chloride/vinyl acetate copolymer and a major proportion of a chlorinated paraffin wax with powdered limestone or talc powder.

U.S. Pat. No. 3,528,841 describes the use of microfine polyolefin powders as parting agents to reduce the tackiness of polymer pellets, particularly vinyl acetate polymers and vinyl acetate copolymers.

Canadian patent 675,522 discloses a process of comminuting elastomeric material for the production of small particles. The process includes presenting a large piece of elastomeric material to a comminuting device, feeding powdered resinous polyolefin into the device, comminuting the elastomeric material in the presence of the powdered polyolefin, and recovering the comminuted elastomeric material.

U.S. Pat. No. 3,884,252 discloses a process for reducing oxidative degradation and cold flow of polymer crumb by immersing the crumb in a non-solvent such as water, and/or dusting the crumb with a powder such as calcium carbonate and 2,6-di-t-butylparacresol, 4,4'-methylene-bis-(2,6-di-t-butylphenol) or another antioxidant. That patent also mentions a process for reducing fluid flow friction loss in pipeline transmission of a hydrocarbon fluid by providing a continuous source of the dissolved polymer.

U.S. Pat. No. 4,016,894 discloses that drag in turbulent aqueous streams may be reduced by a powder composition of a finely divided hygroscopic drag reducing powder, for example, poly(ethylene oxide), and a colloidal size hydrophobic powder, for example, an organosilicon-modified colloidal silica, along with an inert filler such as sodium sulfate. The powder composition is injected into the turbulent stream by first mixing the powder with water to form a slurry and immediately thereafter drawing the slurry through an eductor into a recycle stream between the downstream and upstream ends of a pump for the turbulent stream.

U.S. Pat. No. 4,177,177 describes a polymer emulsification process comprising intimately dispersing a liquified water insoluble polymer phase in an aqueous liquid medium phase containing at least one nonionic, anionic or cationic oil-in-water functioning emulsifying agent. This is done in the presence of a compound selected from hydrocarbons and hydrocarbyl alcohols, ethers, alcohol esters, amines, halides, carboxylic acid esters, and mixtures thereof, which are inert, non-volatile, water insoluble, liquid and contain a terminal aliphatic hydrocarbyl group of at least about 8 carbon atoms. The resulting crude emulsion is subjected to the action of comminuting forces sufficient to enable the production of an aqueous emulsion containing polymer particles averaging less than about 0.5 microns in size.

U.S. Pat. No. 4,263,926 provides a method and apparatus for maintaining polymer particles in readily recoverable, discrete form, and for injecting the particles into a pipeline hydrocarbon by disposing particulate polymer within a storage hopper having a cone bottom and an auger extending upwardly from the bottom. The auger is rotated to cause the polymer particles to revolve in the hopper, reversing the rotation of the auger to pass polymer particles downwardly into a mixing chamber below the hopper. The particles pass through a rotary metering valve, or combination of a bin activator, intermediate storage and rotary metering valve, at the upper end of the chamber, while simultaneously spraying a liquid such as oil or water tangentially in the chamber. The chamber may optionally be agitated and a slurry of particulate polymer and liquid removed therefrom and injected into a pipeline hydrocarbon.

A technique for extremely rapid dissolution or dispersion, essentially on a molecular level, of certain polymeric materials in compatible liquid vehicles is described in U.S. Pat. No. 4,340,076. The polymeric materials are comminuted at cryogenic temperatures and are then introduced into a liquid vehicle, preferably while still at or near cryogenic temperatures. At low concentrations the resulting blend or system displays reduced friction to flow, while high concentrations may be used to immobilize the liquid vehicle and/or to reduce its vapor pressure.

From reviewing the many foregoing prior patents it will be appreciated that considerable resources have been spent on both chemical and physical techniques for easily and effectively delivering drag reducing agents to the fluid that will have its friction reduced. Yet none of these prior methods has proven entirely satisfactory. Thus, it would be desirable to identify a method of size reduction that can be carried out with fewer steps and/or simplified equipment and under non-cryogenic conditions, wherein the resulting particulate DRA is suitable for incorporation into a slurry or dispersion at relatively high polymer concentration levels.

SUMMARY OF THE INVENTION

An object of the invention is to provide a process for producing a particulate polymer drag reducing agent of suitable small particle size and adequate surface area that will readily dissolve and dissipate in flowing hydrocarbon streams.

Another object of the invention includes providing a particulate polymer DRA that can be readily manufactured and which does not require cryogenic temperatures to be produced.

In carrying out these and other objects of the invention, there is provided, in one aspect, a method for producing a particulate polymer drag reducing agent comprising granulating a polymer DRA in the presence of a liquid wetting agent to form a granulated polymer DRA, and grinding the granulated polymer DRA to form a particulate polymer DRA. In one non-limiting embodiment of the invention, cryogenic temperatures are not used in the process and only one granulation step is employed. In another non-limiting embodiment, the granulation is carried out using multiple rotary jaws.

In yet another embodiment, the invention is a particulate polymer DRA produced by a method comprising granulating a bulk polymer DRA to form a granulated polymer DRA having an average particle size from about 1 to about 100 mm, and grinding the granulated polymer DRA to form a particulate polymer DRA having an average particle size of less than about 1 mm. In still another embodiment the invention is a method of reducing drag in a hydrocarbon stream comprising incorporating therein a polymer DRA produced by the method of the invention.

DETAILED DESCRIPTION OF THE INVENTION

In the inventive process one or more wet granulations are carried out using a wetting agent. As used herein, the term "wetting agent" refers to a material which, when incorporated with the polymer DRA to be comminuted, serves to reduce the attachment of polymer DRA to the contacted portions of the cutting device being used for the comminution, thereby facilitating the comminution process and resulting in more effective comminution in less time. With more effective comminution, less granulation time, and/or fewer granulation steps, will be needed to comminute the polymer DRA to an average particle size that is suitable for subsequent grinding. Particularly advantageous is the fact that such can conveniently be done under non-cryogenic conditions.

As used herein, the term "granulation" refers to comminution resulting in an average particle size of greater than or equal to about 1 mm, but less than the size of the bulk polymer, e.g., a slab polymer, as formed during the polymerization process. In one non-limiting embodiment the average particle size of a granulated polymer is less than about 100 mm, but greater than about 1 mm. In other non-restrictive embodiments the average particle size is less than about 50 mm, and in still other alternate embodiments it is less than about 20 mm. Such wet granulation may be carried out as one or as a series of granulation steps. In contrast, "grinding" refers to comminution resulting in an average particle size of less than about 1 mm, and in some non-limiting embodiments the average particle size of a ground polymer DRA is less than or equal to about 600 microns. In other non-restrictive embodiments the average particle size of a ground polymer DRA is less than or equal to about 300 microns. "Grinding" may thus refer to any milling, pulverization, attrition, or other size reduction that begins with a granulated polymer and results in the final particulate polymer drag reducing agents. It should be noted that, as the terms "granulation" and "grinding" are used herein, they are independent of the equipment being used. Thus, what is defined herein as granulation may be accomplished in what would technically be termed by some as grinding equipment, and what is defined herein as grinding may be accomplished in what would technically be termed by some as granulation equipment.

Generally, the polymer that is processed in the method of this invention may be any conventional or art-known polymeric drag reducing agent (DRA) including, but not necessarily limited to, polyalpha-olefin, polychloroprene, vinyl acetate polymers and copolymers, polyalkylene oxide, and mixtures thereof and the like. It is desirable that the polymeric DRA is, in some embodiments, is of a structure (i.e., molecular weight) that is sufficient to allow it to exist as a neat solid which generally lends itself to the pulverizing process, i.e., the process of being sheared by mechanical forces to smaller particles. A DRA of a relatively harder, solid nature (i.e., having a relatively higher glass transition temperature) than polyalpha-olefin may be utilized in some embodiments. A DRA of a relatively softer nature (i.e., having a lower glass transition temperature, for example, a more rubbery polymer) may also be used, but it would be expected to be relatively more difficult to pulverize by this process. Generally, polymer DRAs that exist as dissolved in solution (i.e., gel polymers) are unsuited to comminution in the present invention.

In the present invention a wetting agent is employed. Such wetting agent is desirably relatively polar and inert to the polymer, at least for the time period and at the temperatures to be used for granulation. It also desirably imparts a degree of lubricity to the granulated polymer, which tends to reduce any tendency of the polymer to adhere, statically or otherwise, to the granulation equipment and/or vessel. In certain non-restrictive embodiments it may be selected from the group consisting of blends of at least one glycol with water and/or an alcohol. Glycols may include, but are not necessarily limited to, the group consisting of ethylene glycol, propylene glycol, diethylene glycol, dipropylene glycol, hexylene glycol, methyl ethers of such glycols, and the like mixtures thereof. Suitable alcohols may include, but are not necessarily limited to, alcohols selected from the group consisting of methanol, ethanol, isopropanol (isopropyl alcohol, IPA), hexanol, heptanol, octanol, and the like, and mixtures thereof.

In wet granulation of the polymer DRA, it is desirable to employ as the granulating equipment an apparatus that will subject the polymer DRA in its bulk or near-bulk form, e.g., slab polymer having dimensions measured in very large scale (e.g., feet, inches or centimenters), to cutting/shearing forces to result in a granulated polymer DRA having an average particle size that is less than the starting size but greater than about 1 mm. While in prior art processes a rotary blade is generally used, which blade exerts shear force against a stationary blade at relatively close clearance, in some embodiments the present invention employs instead an apparatus having multiple rotary cutting jaws. Such an apparatus offers significant advantages over the prior art rotary blade design, since the multiple jaws multiply the contacts between the cutting edge and the polymer DRA, therefore expediting the comminution process, while the absence of a close clearance reduces the tendency of the polymer DRA to adhere to the cutting edge and/or other parts of the equipment. Examples of suitable wet granulation equipment having multiple rotary jaws include the TASKMASTER™, manufactured by Franklin Miller, and the ANNIHILATOR™, manufactured by Moyno.

Following the wet granulation, or, if desired, series of two or more wet granulations, the polymer DRAs of the invention may be ready for grinding. As noted hereinabove, their average particle size at the completion of granulation is, in certain desirable, non-limiting embodiments, less than about 20 mm, but greater than or equal to about 1 mm, particles of such size range being overall relatively suitable for a subsequent grinding process to further reduce particle size to a point where the particulate polymer DRA can be effectively dispersed, via combination with a suitable dispersal agent, to form a slurry or dispersion which can then be introduced into a hydrocarbon stream where drag reduction is desired.

Grinding of the polymer that has been granulated by the method of the invention may be carried out using any art-known attrition mill pulverizing technology in combination with one or more grinding aids to render a final ground, particulate polymer having an average particle size that is less than about 1 mm, and desirably less than or equal to about 600 microns. While grinding mills, particularly attrition mills such as Pallmann attrition mills, Munson centrifugal impact mills, Palmer mechanical reclamation mills, pipeline mixers, colloid mills, such as those produced by Greerco, combinations thereof, and the like may be used in various non-limiting embodiments of the invention, other types of grinding equipment may alternatively be used in or with the method of this invention.

In one non-limiting embodiment of this invention, both granulation and grinding are conducted at non-cryogenic temperatures. For the purposes of this invention, cryogenic temperature is defined as the glass transition temperature ($T_g$) of the particular polymer having its size reduced or being ground, or below that temperature. It will be appreciated that $T_g$ will vary with the specific polymer being ground. Typically, $T_g$ ranges between about −10° C. and about −100° C. (about 14° F. and about −148° F.), in one non-limiting embodiment. In another non-limiting embodiment of the invention, the granulation and/or grinding is conducted at ambient temperature. For the purposes of this invention, ambient temperature conditions are defined as between about 20-25° C. (about 68-77° F.). In another non-limiting embodiment of the invention, ambient temperature is defined as the temperature at which grinding occurs without any added cooling. Because heat is generated in the grinding process, "ambient temperature" may thus in some contexts mean a temperature greater than about 20-25° C. (about 68-77° F.). In still another non-limiting embodiment of the invention, the granulation and/or grinding to produce particulate polymer drag reducing agent is conducted at a chilled temperature that is less than ambient temperature, but that is greater than cryogenic temperature for the specific polymer being granulated or ground. A preferred chilled temperature may range from about −7 to about 2° C. (about 20 to about 35° F.).

In some embodiments an anti-agglomeration agent may be applied to the granulated polymer DRA prior to grinding it. Such anti-agglomeration agents include, but are not necessarily limited to talc, alumina, ethylene bis-stearamide, and the like and mixtures thereof.

Those skilled in the art will appreciate that many modifications may be made in the invention without departing from the spirit and scope, as defined in the appended claims, thereof. For example, the exact nature and proportions of polymer, wetting agent, and granulating apparatus may be different from those used here. Feed rates and equipment, and grinding means and methods may also be varied while remaining within the scope of the invention.

The invention will now be further described with respect to specific examples that are provided only to further illustrate the invention and not limit it in any way.

EXAMPLE 1

A wetting agent consisting of a mixture of hexanol, ethylene bis-stearamide and dipropylene glycol methyl ether in the ratio 3:0.1:1 is prepared in an agitated tank. This mixture is then pumped using a low shear pump into a wet granulator having two rotary jaws at a rate of from about 10 to about 120 pounds per hour. The rotors rotate at different speed for efficient cutting. At the same time, a 2 foot by 4 foot slab of polyolefin DRA is fed, via a low profile conveyor, into the granulator at a rate of 110-1440 pounds per hour, wherein the slab is granulated, at an average temperature of from 40 to 80° F., During the granulation process a heat exchanger helps to protect the polymer DRA from heat degradation. Finally, the granulated polymer and the mixture of hexanol, ethylene bis-stearamide and dipropylene glycol methyl ether is pumped to a storage tank, from which it can be transported for subsequent grinding.

We claim:

1. A method for producing a granulated polymer drag reducing agent (DRA), comprising:

granulating a bulk polymer DRA having an average size greater than about 100 mm in the presence of a liquid wetting agent to form a granulated polymer DRA having an average size from about 1 to about 100 mm.

2. The method of claim 1 wherein the granulated polymer DRA has an average particle size between about 1 mm and about 20 mm.

3. The method of claim 1 wherein the polymer DRA is polyalpha-olefin.

4. The method of claim 1 wherein the liquid wetting agent is selected from the group consisting of blends of at least one glycol selected from the group consisting of ethylene glycol, propylene glycol, diethylene glycol, dipropylene glycol, hexylene glycol, methyl ethers of such glycols, and mixtures thereof, and at least one other liquid selected from the group consisting of water and alcohol, the alcohol being selected from the group consisting of methanol, ethanol, isopropanol, hexanol, heptanol, octanol, and mixtures thereof.

5. The method of claim 1 wherein the granulation is carried out under non-cryogenic conditions.

6. The method of claim 1 wherein the granulation is carried out using an apparatus having multiple rotary jaws.

7. The method of claim 1 wherein the granulated polymer DRA is thereafter ground to form a particulate polymer DRA having an average size less than about 1 mm.

8. A method of reducing drag in a hydrocarbon stream comprising:

granulating a bulk polymer drag reducing agent (DRA) having an average size greater than about 100 mm in the presence of a liquid wetting agent to form a granulated polymer DRA having an average particle size of from about 1 to about 100 mm;

grinding the granulated polymer DRA to form a particulate polymer DRA; and incornorating the particulate polymer DRA into a hydrocarbon stream.

9. The method of claim 8 wherein the granulated polymer DRA is polyalpha-olefin.

10. The method of claim 8 wherein the liquid wetting agent is selected from the group consisting of blends of at least one glycol selected from the group consisting of ethylene glycol, propylene glycol, diethylene glycol, dipropylene glycol, hexylene glycol, methyl ethers of such glycols, and mixtures thereof, and at least one other liquid selected from the group consisting of water and alcohol, the alcohol being selected from the group consisting of methanol, ethanol, isopropanol, hexanol, heptanol, octanol, and mixtures thereof.

11. The method of claim 8 wherein the granulation is carried out using multiple rotary jaws.

12. A method for producing a granulated polymer drag reducing agent (DRA), comprising granulating a bulk polyalpha-olefin DRA having an average size greater than about 100 mm in the presence of a liquid wetting agent to form a granulated polymer DRA having an average size from about 1 to about 100 mm, wherein the liquid wetting agent is selected from the group consisting of blends of at least one glycol selected from the group consisting of ethylene glycol, propylene glycol, diethylene glycol, dipropylene glycol, hexylene glycol, methyl ethers of such glycols, and mixtures thereof, and at least one other liquid selected from the group consisting of water and alcohol, the alcohol being selected from the group consisting of methanol, ethanol, isopropanol, hexanol, heptanol, octanol, and mixtures thereof.

13. The method of claim 12 wherein the granulated polymer DRA has an average particle size between about 1 mm and about 20 mm.

14. The method of claim 12 wherein the granulation is carried out under non-cryogenic conditions.

15. The method of claim 12 wherein the granulation is carried out using an apparatus having multiple rotary jaws.

16. The method of claim 12 wherein the granulated polymer DRA is thereafter ground to form a particulate polymer DRA having an average size less than about 1 mm.

* * * * *